May 28, 1940.　　　W. M. MILLER　　　2,202,221
TRAILER BRAKE
Filed March 23, 1938　　　2 Sheets-Sheet 1
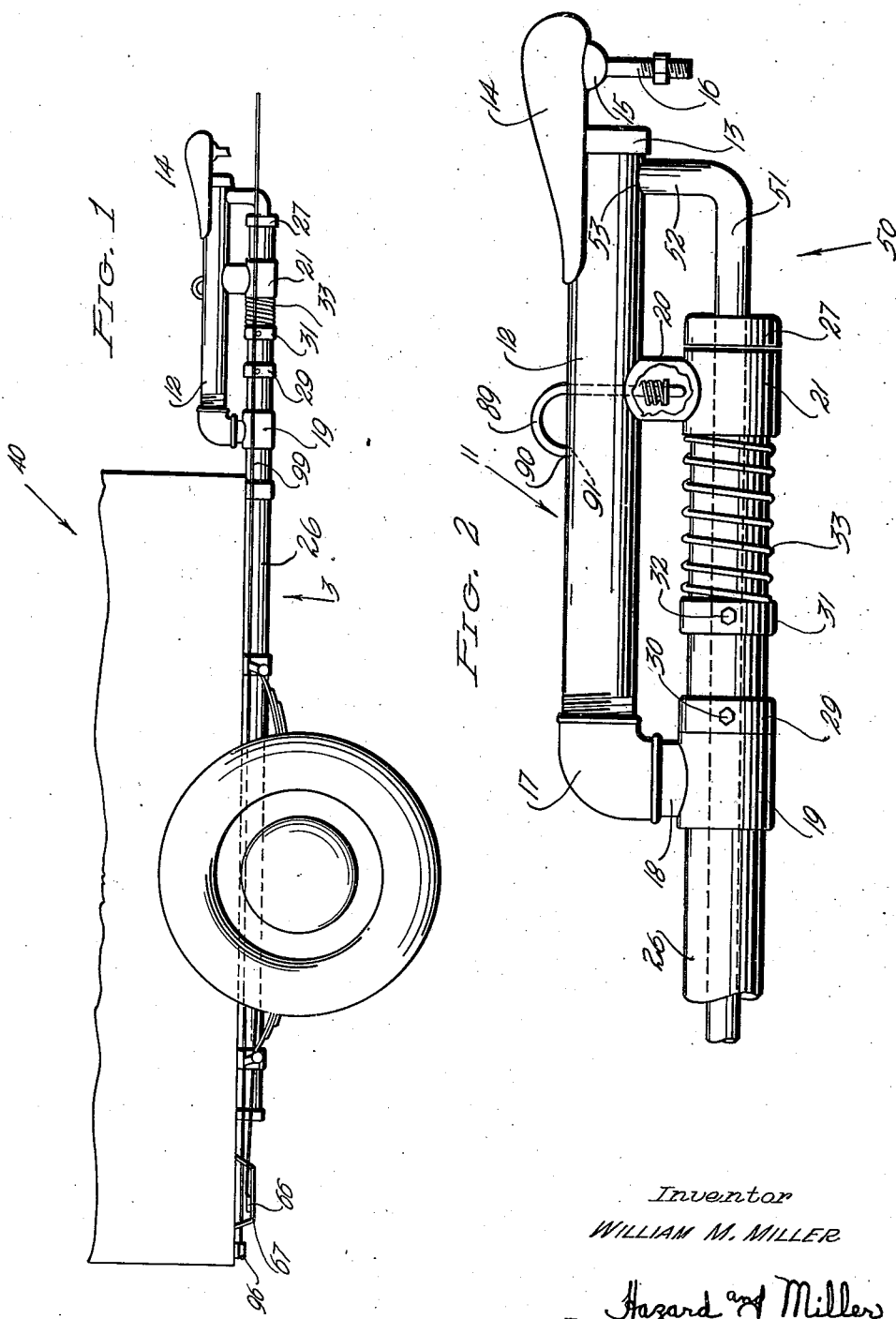
Inventor
WILLIAM M. MILLER
By Hazard and Miller
Attorneys May 28, 1940.  W. M. MILLER  2,202,221
TRAILER BRAKE
Filed March 23, 1938  2 Sheets-Sheet 2
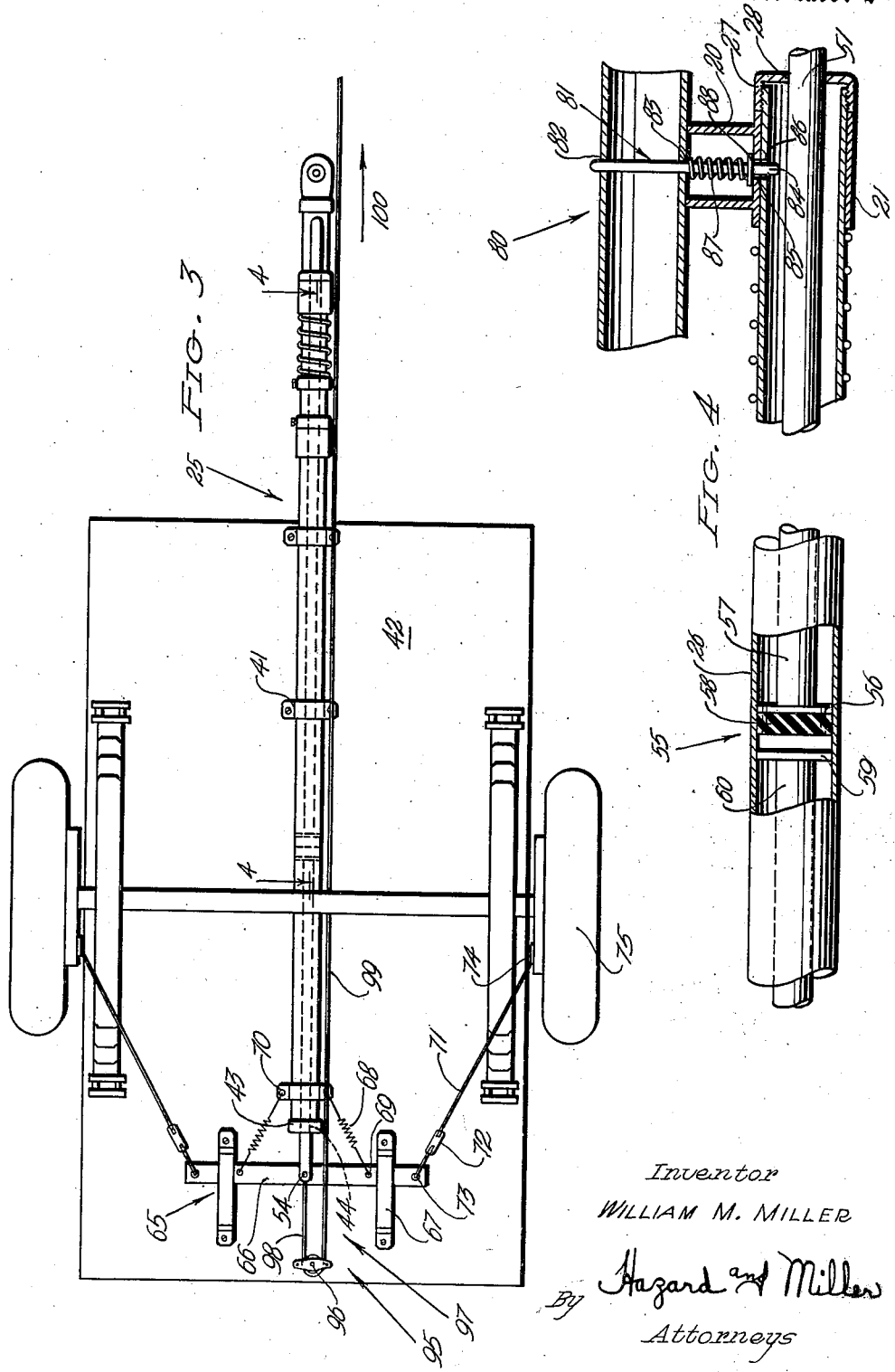
Inventor
WILLIAM M. MILLER
By Hazard and Miller
Attorneys Patented May 28, 1940

2,202,221

UNITED STATES PATENT OFFICE 2,202,221

TRAILER BRAKE

William M. Miller, Yucaipa, Calif.

Application March 23, 1938, Serial No. 197,636

6 Claims. (Cl. 188—142)

My invention relates to a brake particularly adapted for a semi-trailer and is an improvement on the so-called overrun type of brake. By such overrun type is meant a brake in which the pressure application is obtained when the trailer runs up on the towing car due to the towing car slackening its speed.

An object and feature of my invention is in providing a drop type of tow connection from the tow car through the draw bar to the trailer by which a straight longitudinal tube may be mounted underneath the floor of the trailer. The direct towing action is through this tube. A further feature of my invention is mounting the slidable towing tube in a tow bar which is connected by a swivel to the towing car whereby a relative sliding motion may be developed between the towing tube and the tow bar and the towing thrust transmitted by means of interengaging sleeves and collars. This construction thereby makes a direct transmission through the tow bar provided with sleeves and collars on the towing tube giving the pull to the trailer but allowing a forward slippage of the towing tube in reference to the tow bar on the slackening of speed of the tow car.

Another object and feature of my invention is mounting a brake applying device or mechanism operative between the two bar through the tube to the brake appliances whereby the forward slippage of the towing tube causes an application of the brakes by the relative displacement of the brake device and the tow tube. In this connection a more detailed object and feature of my invention is the provision of a brake rod which has a rigid connection at its forward end to the tow bar and passes axially through the tow tube from one end to the other. The opposite end of the brake rod is connected to the brake appliances of the trailer, then on account of the slippage connection between the tow tube rigidly connected to the trailer body having a sliding action with the tow tube and the trailer body, the relative motion of the brake rod and the tow tube may be used to apply the brakes. In this connection a further detailed object of my invention is having a resilient compression member such as a spring which gradually retards the forward overrun of the trailer as to the tow car and hence causes a gradual application of the brakes on the trailer in contradistinction to a sudden forcible application and a quick release when the tow car pulls ahead of the trailer.

A further object and feature of my invention includes a locking assembly with a locking bolt by which the brake mechanism, this including the tow tube and the brake rod are locked into a relatively stationary position with the brakes free, this being for the purpose of readily backing the trailer by backing the tow car.

My invention also comprehends a construction for manually applying the brakes of the trailer from the tow car by manipulating the brake rod giving this a pull rearwardly as to one portion which is the equivalent of the tow tube moving forward as to the brake rod, this construction being accomplished by dividing the brake rod into two parts with a buffer-like thrust connection. In the normal action of the brakes automatically the buffer and the rod only transmits a thrust and hence the rear end may be manually actuated to develop a rearward movement relative to the tow tube and trailer body and thus apply the brakes. This if desired may be accomplished through a connection with the emergency brake of the tow car or through a separate lever or the like for the trailer.

My invention is illustrated in connection with the accompanying drawings, in which:

Fig. 1 is a side elevation of the towing and brake assemblies in the brake application position.

Fig. 2 is an elevation similar to Fig. 1 on a larger scale of the tow bar, tow tube and brake rod assemblies in the brake applying position.

Fig. 3 is an inverted view taken in the direction of the arrow 3 of Fig. 1.

Fig. 4 is a broken section through the tow bar, the towing tube and showing the brake rod in elevation taken substantially on the section 4—4 of Fig. 3 in the direction of the arrows.

In my construction I utilize a tow bar 11. This is formed of a pipe 12 preferably with a cap 13 at its forward end, a substantial lug 14 provided with a bowl construction 15 and a bolt 16 for attaching to a complementary semi-spherical socket on a tow car. At the rear end of the tow bar I employ a elbow 17 with a short pipe section 18 connected directly to the elbow and a sleeve 19 attached to the short pipe 18. Also firmly attached to the tow bar there is a forward depending pipe 20 terminating in a forward sleeve 21. The axis of the sleeves 19 and 21 are in direct alignment and in the same vertical plane as the center of the bolt 16.

The tow tube assembly 25 includes a towing tube 26 which extends through both of the sleeves 19 and 21. At its forward end is secured an end cap 27, this having a central guide perforation 28. Adjustably mounted on the towing tube there is a rear thrust collar 29 attached to the tow tube by a set screw 30 or the equivalent. A spring abutment collar 31 is also attached to the tow tube by a set screw 32 or the like and forms a thrust shoulder, a helical coil compression spring 33 wound around the tow tube between the collar 31 and the forward sleeve, developing a thrust connection therebetween. The tow tube is attached to the trailer designated generally by the assembly numeral 40 by clamps 41 attached to the floor 42 of the trailer body or these may be attached to the chassis of the body, depending on the particular construction of the trailer. The rear end of the towing tube 26 terminates in an end cap 43 having a perforation 44 therethrough.

The brake rod assembly 50 includes a longitudinal rod 51 which may be made in the form of a stiff tube. This has an upwardly turned forward end 52 rigidly secured at 53 to the forward portion of the tow bar 12, the attaching being preferably by welding. This upturned end is in the same vertical plane as the short pipes 18 and 20. The rod extends through the perforation 28 of the end cap 27, extends centrally through the towing tube and the rear end of the rod assembly passes through the end cap 43 being guided by the guide perforation 44. The rear end is provided with a pin or the like 54 for connecting to a brake appliance. The rod 51 may be made continuous if desired, however in order to have this rod for use in manual application of the brakes as hereunder detailed I provide a separable joint indicated at 55. This joint includes a thrust disk 56 attached to the forward portion 57 of the rod. On this plate is mounted a rubber cushion 58 which reacts against a second or rear thrust disk 59 on the rear portion 60 of the brake rod.

The brake appliance 65 may be of any suitable type but in the illustration I show an equalizing brake beam 66 pivoted to a pin extending through the perforation in the rear end 52. A pair of guide brackets 67 and the underside of the floor of the trailer form guides for the longitudinal motion of the brake beam. This beam is retracted, that is, under a pull towards its forward position by retraction springs 68 secured at 69 to the equalizing beam and at 70 to one of the clamps 41. Brake applying links 71 each having a turn-buckle or the equivalent 72 are connected at 73 to the outer ends of the brake beam and lead to brake equipment 74 on the wheel assembly 75 of the vehicle.

A lock-out mechanism designated by the numeral 80 includes a lock-out bolt 81. This is guided through perforations 82 and 83 in the tow tube 12, these perforations being vertically aligned. The lower end 84 passes through perforations 85 in the sleeve 21 and 86 in the forward portion of the tow tube 26. A compression thrust spring 87 is coiled around the bolt and reacts against the underside of the tow bar 12 and a collar 88 attached to the bolt. The bolt is preferably centrally aligned with the short pipe 20. In order to hold the bolt out of its locking position and to manipulate this it is provided with a finger grip end 89 made in the form of a hook and having an end 90 normally engaged in a socket 91 on the upper surface of the tow bar 12. When the bolt is raised in the position of Fig. 2, the end being engaged in the socket the lower end 84 is elevated above the perforation 86 of the tow tube 26 but this bolt may be lifted by the fingers and then turned a 90 degree turn so that the hook 89 is at one side of the tube 12 and this allows the bolt to be forced downwardly by the spring 87 and engage the tow bar 26 in a locking position.

In the manner of setting up and operating the brakes, if desired the collar 29 may be adjusted so that when the trailer is in the towing position with the brakes completely released, there will be a towing thrust between the sleeve 19 of the tow bar assembly 11 and the collar 29 attached to the tow tube and also between the sleeve 21 and the end cap 27. However this requires accurate adjustment and it is sufficient to have all the towing stresses between the sleeve 19 and the collar 29. It will be seen that when the bolt assembly 80 is in the released position that the towing forces are transmitted through the tow bar assembly 11, the respective sleeves and collars to the tow tube 26 and as this is rigidly clamped to the trailer body or chassis, that there is substantially a direct towing action. When the tow car decelerates usually due to application of the brakes on the tow car, the momentum of the trailer causes this to run forward, that is, to override the tow car. As the brake rod 51 is rigidly connected to the tow bar 12, the tow tube and the trailer body must ride forwardly on the brake rod. This causes a relative rearward movement of the equalizing brake beam 66 in reference to the wheels of the vehicle and thus exerts a tension pull on the brake links 71 and thus applies the brakes. The spring 33 resists this forward movement of the trailer causing it to advance relatively slowly in regard to the brake rod 51 and hence prevents a quick and sudden application of the brakes of the trailer and again a quick release so that as the spring 33 is gradually compressed there is the same gradual movement between the brake rod 51 and the brake tube 26 causing a gradual application of the brake shoes. Of course it will be understood that should the tow car stop suddenly the momentum of the trailer is sufficient to make a quick application of the brakes of the trailer. The spring 33 however does not have sufficient strength as a rule to positively move the trailer rearwardly in reference to the tow car when this has been brought to a stop but so long as the tow car is stationary, usually with its brakes applied, the brakes also remain applied on the trailer but on the forward movement of the tow car the brakes become released on the trailer.

When it is desired to lock out the brake system in order to back the trailer by the tow car, the brake rod 51 is moved forwardly in reference to the tow tube as when towing the trailer to align the bolt 81 with the perforation 86 in the tow tube. The bolt may then be turned from its inactive position of Fig. 4, thus locking the tow tube 26 and the tow bar 12 and allowing backing forces to be transmitted through the tow bar and the bolt to the tow tube and hence to the trailer.

The equipment for the manual application of the brakes designated by the assembly numeral 95 includes a reverse direction pulley 96 mounted on the trailer body and employing a cable 97 with a run 98 attached to the rear end 62 of the brake rod or to the brake beam 66. The bight of the cable passes over the pulley and a forward run 99 extends preferably underneath the trailer body parallel to the tow tube assembly past the coupling connection to the tow car where it may be connected to a manually actuated lever, such as the emergency brake lever of the car. This is of use for instance when it is desired to manually apply the brakes of the trailer, irrespective of the automatic action or if desired in addition thereto to give a tighter clamping of the brakes. To apply the brakes manually a pull in the direction of the arrow 100 on the cable portion 99 pulls the rear portion 60 of the brake rod assembly 50 rearwardly and thus has the same action on the brake beam and the brake links 71 as a direct thrust through the separable joint 55.

Various changes may be made in the details of the construction without departing from the spirit or scope of the invention as defined by the appended claims.

I claim:

1. A trailer brake comprising in combination a tow bar having means providing a swivel connection to a tow car, a plurality of aligned sleeves rigidly connected to the tow bar and offset with the axes of the sleeves positioned below the tow bar, a tow tube slidably mounted in said sleeves and having a first collar to engage the rearwardmost sleeve, means rigidly attaching the tow tube to a trailer, a brake rod rigidly connected to the forward portion of the tow bar and extending rearwardly through the tow tube, a brake appliance connected to the rear end of the brake rod and having a connection to the brakes of the trailer whereby a relative forward movement of the tow tube and trailer in reference to the tow bar and the brake rod develops a thrust action between the brake rod and the brake appliance to apply the brakes.

2. A trailer brake as claimed in claim 1, a second collar attached to the tow tube forward of the first collar, a compresison spring between the first collar and the forward sleeve of the tow bar to react against the forward movement of the tow tube and trailer in reference to the tow bar.

3. A trailer brake as claimed in claim 1, the connection of the forward sleeve to the tow bar including a tube, a lock out means including a bolt slidably mounted in the tow bar and operating through the said tube, the forward sleeve and the tow car having alignable perforations with the said bolt adapted to engage therein to lock the tow tube in its rearwardmost position.

4. A trailer brake as claimed in claim 1, a manual means for operating the brake appliance including a flexible connection from the tow car to the rear end of the brake rod, the said brake rod having a separable thrust joint inoperative to transmit a pull and permitting a rearward movement of the rear part of the brake rod with reference to the forward part of such rod.

5. In a trailer brake the combination of a tow bar having an offset sleeve rigidly connected thereto, a tow tube slidably mounted in said sleeve, a thrust reacting means between said tube and the tow bar to transmit a towing pull, means rigidly attaching the tow tube to the trailer, a brake actuating means interconnected between the tow bar and a brake appliance on the trailer and adapted to apply the brakes on the relative forward motion of the tow tube in reference to the tow bar, a locking out device including a collar secured to the tow tube, a spring reacting against the collar and the said sleeve, a bolt slidably mounted in the tow bar and adapted to engage the tow tube to lock said tube in its rearward towing position and hence prevent application of the brakes.

6. In a trailer brake as claimed in claim 5, the brake actuating means including a brake rod rigidly connected to the tow bar and extending through the tow tube, the said spring on retraction of the bolt being operative to resist the forward motion of the tow tube in reference to the brake rod.

WILLIAM M. MILLER.